United States Patent
Kawakita

(10) Patent No.: US 10,559,142 B2
(45) Date of Patent: Feb. 11, 2020

(54) INFORMATION PROCESSING SYSTEM

(71) Applicant: ALLIED TELESIS HOLDINGS K.K., Tokyo (JP)

(72) Inventor: Jun Kawakita, Tokyo (JP)

(73) Assignee: ALLIED TELESIS HOLDINGS K.K., Tokyo (JP)

( * ) Notice: Subject to any disclaimer, the term of this patent is extended or adjusted under 35 U.S.C. 154(b) by 0 days.

(21) Appl. No.: 15/127,761

(22) PCT Filed: Feb. 1, 2016

(86) PCT No.: PCT/JP2016/052925
§ 371 (c)(1),
(2) Date: Sep. 20, 2016

(87) PCT Pub. No.: WO2017/134729
PCT Pub. Date: Aug. 10, 2017

(65) Prior Publication Data
US 2017/0278327 A1 Sep. 28, 2017

(51) Int. Cl.
*G07C 9/00* (2006.01)
*G06K 9/00* (2006.01)
*H04W 84/12* (2009.01)

(52) U.S. Cl.
CPC ..... *G07C 9/00079* (2013.01); *G06K 9/00255* (2013.01); *G06K 9/00295* (2013.01); *G06K 9/00771* (2013.01); *H04W 84/12* (2013.01)

(58) Field of Classification Search
CPC .......... G07C 9/00079; G06K 9/00255; G06K 9/00295; G06K 9/00771
(Continued)

(56) References Cited

U.S. PATENT DOCUMENTS

| 7,183,895 | B2 * | 2/2007 | Bazakos | G06K 9/00228 235/375 |
| 8,755,770 | B2 * | 6/2014 | Haverty | H04K 3/45 102/215 |

(Continued)

FOREIGN PATENT DOCUMENTS

JP 2006293913 A 10/2006
JP 2013219608 A 10/2013
(Continued)

OTHER PUBLICATIONS

International Search Report for serial No. PCT/JP2016/052925 dated Apr. 19, 2016.

*Primary Examiner* — Yong Hang Jiang
(74) *Attorney, Agent, or Firm* — Brooks Acordia IP Law, PC; Michael Zarrabian

(57) ABSTRACT

Provided is an information processing system that identifies communication terminal identification information of a portable communication terminal used by a user when the user uses communication through an access point. An information processing system includes a communication terminal identification information storage unit that stores the communication terminal identification information of the portable communication terminal that performs communication using the wireless communication device, a person identifying information comparison processing unit that determines whether there is a same person using at least two or more pieces of person identifying information acquired in a person identifying information acquisition device in a certain wireless LAN communication spot where the wireless communication device exists, and a communication terminal identification information narrowing-down processing unit that performs, from the communication terminal identification information storage unit, processing for narrowing down the communication terminal identification information of the portable communication terminal of the user who performs communication using the wireless communication device, by extracting pieces of communication terminal identification information corresponding to the respective pieces of person identifying information from the communication terminal identification information storage unit, and identifying common communication terminal identification information, when existence of the same person is determined as a result of the determination.

17 Claims, 10 Drawing Sheets

(58) Field of Classification Search
USPC .......................................................... 340/5.53
See application file for complete search history.

(56) References Cited

U.S. PATENT DOCUMENTS

| | | | |
|---|---|---|---|
| 2002/0150096 A1* | 10/2002 | Sjoblom | H04L 63/0428 370/389 |
| 2004/0014423 A1* | 1/2004 | Croome | H04L 63/08 455/41.2 |
| 2006/0120571 A1* | 6/2006 | Tu | G06K 9/00281 382/118 |
| 2007/0109099 A1* | 5/2007 | Raphaeli | G01S 13/758 340/10.2 |
| 2007/0286208 A1* | 12/2007 | Kanada | H04L 41/12 370/395.53 |
| 2015/0024782 A1* | 1/2015 | Edge | H04W 4/04 455/456.3 |

FOREIGN PATENT DOCUMENTS

| | | |
|---|---|---|
| JP | 2014160394 A | 9/2014 |
| JP | 2015194930 A | 11/2015 |
| JP | 2015211298 A | 11/2015 |

* cited by examiner

FIG. 4

| WIRELESS LAN COMMUNICATION AREA | DATE AND TIME | COMMUNICATION TERMINAL IDENTIFICATION INFORMATION |
|---|---|---|
| AREA 1 | 2016/1/20 10:01:10 | 12-34-56-78-90-12 |
| | 2016/1/20 10:01:20 | 34-56-78-90-12-34 |
| | 2016/1/20 10:02:30 | 56-78-90-12-34-56 |
| | 2016/1/20 10:02:40 | 78-90-12-34-56-78 |
| AREA 2 | 2016/1/20 10:04:50 | 12-34-56-78-90-12 |
| | 2016/1/20 10:05:00 | 34-56-78-90-12-34 |
| | 2016/1/20 10:05:10 | 90-12-34-56-78-90 |
| | 2016/1/20 10:05:30 | 12-AB-34-CD-56-EF |
| AREA 3 | 2016/1/20 10:06:50 | 12-34-56-78-90-12 |
| | 2016/1/20 10:07:00 | 90-12-34-56-78-90 |
| | 2016/1/20 10:07:10 | 12-AB-34-CD-56-EF |
| | 2016/1/20 10:07:20 | 34-GH-56-IJ-78-KL |

FIG. 7

| WIRELESS LAN COMMUNICATION AREA | DATE AND TIME | COMMUNICATION TERMINAL IDENTIFICATION INFORMATION |
|---|---|---|
| AREA 1 | 2016/1/20 10:01:10 | 12-34-56-78-90-12 |
|  | 2016/1/20 10:01:20 | 34-56-78-90-12-34 |
|  | 2016/1/20 10:02:30 | 56-78-90-12-34-56 |
|  | 2016/1/20 10:02:40 | 78-90-12-34-56-78 |
| AREA 1 | 2016/1/20 10:15:50 | 12-34-56-78-90-12 |
|  | 2016/1/20 10:16:00 | 34-56-78-90-12-34 |
|  | 2016/1/20 10:16:10 | 90-12-34-56-78-90 |
|  | 2016/1/20 10:16:30 | 12-AB-34-CD-56-EF |
| AREA 1 | 2016/1/20 10:26:50 | 12-34-56-78-90-12 |
|  | 2016/1/20 10:27:00 | 90-12-34-56-78-90 |
|  | 2016/1/20 10:28:10 | 12-AB-34-CD-56-EF |
|  | 2016/1/20 10:29:20 | 34-GH-56-IJ-78-KL |

INFORMATION PROCESSING SYSTEM

TECHNICAL FIELD

The present invention relates to an information processing system that identifies communication terminal identification information of a portable communication terminal used by a user when the user uses communication through an access point.

BACKGROUND ART

In recent years, access points of public wireless LANs have been put in place. In a case of accessing a network outside home, use of a wireless LAN function of the portable communication terminal has been increased. Accordingly, wireless communication is performed between an access point or a wireless LAN switch (wireless LAN master device) installed in a wireless LAN communication spot, and the portable communication terminal (extension device), and an access to the Internet through the wireless LAN communication spot becomes available.

When the wireless communication is performed between the access point or the wireless LAN switch installed in the wireless LAN communication spot, and the portable communication terminal, the portable communication terminal is identified with communication terminal identification information such as a MAC address, and the wireless communication is performed. Therefore, in the wireless LAN communication spot, the portable communication terminal that is performing the wireless communication is managed with the communication terminal identification information. Patent Literature 1 describes an example of the wireless communication using the wireless LAN.

CITATION LIST

Patent Literature

Patent Literature 1: JP 2015-211298 A

SUMMARY OF INVENTION

Technical Problem

In the access to the Internet through the wireless LAN communication spot, like Patent literature 1, the portable communication terminal can be identified only with the communication terminal identification information in the access point or the wireless LAN switch, and who is actually using the wireless communication can be identified only after an input of a user ID or the like is accepted at the time of using the wireless LAN. In general, although personal information can be identified by making an inquiry to a communication provider, the communication provider does not disclose who uses the communication terminal identification information to a third person, in principle, from the perspective of privacy of communication, protection of personal information, and the like.

Due to such a mechanism, when a person, who is registered to be at a high risk for criminal wrongdoing, uses the Internet through the wireless LAN to conduct a criminal act, for example, immediate interruption of the communication for prevention of the criminal act is required. However, conventionally, only the communication terminal identification information can be obtained in the access point or the wireless LAN switch, and thus whether the person who is using the wireless LAN communication spot is the person at a high risk for criminal wrongdoing cannot be inherently identified. Therefore, interruption or interception of the communication cannot be made.

Therefore, a system to promptly identify the communication terminal identification information when a person registered in advance is using the public wireless LAN in the wireless LAN communication spot is desired.

Solution to Problem

In view of the foregoing, the present inventor has invented an information processing system that identifies communication terminal identification information of a user of a portable communication terminal that is performing communication through a public wireless LAN in a wireless LAN communication spot.

A first invention is an information processing system that identifies communication terminal identification information of a user who performs communication with a portable communication terminal using a wireless communication device, the information processing system including: a communication terminal identification information storage unit configured to store the communication terminal identification information of the portable communication terminal that performs communication using the wireless communication device; a person collation processing unit configured to perform collation as to whether there is a person registered in advance using person identifying information acquired in a person identifying information acquisition device in a wireless LAN communication spot where the wireless communication device exists; a candidate information identifying processing unit configured to identify, from the communication terminal identification information storage unit, the communication terminal identification information as candidate information, by extracting the communication terminal identification information corresponding to the person identifying information from the communication terminal identification information storage unit, when existence of the person registered in advance is determined as a result of the collation; and a communication terminal identification information identifying processing unit configured to perform processing for narrowing down the communication terminal identification information of the portable communication terminal of the user who performs communication using the wireless communication terminal, by identifying common communication terminal identification information from at least two or more pieces of the candidate information for a same person.

With such a configuration of the present invention, the communication terminal identification information of the portable communication terminal of the user who is using the wireless LAN communication spot can be narrowed down and identified. Therefore, interruption or interception of the communication between the wireless communication device such as an access point or a wireless LAN switch and the portable communication terminal becomes possible based on the identified communication terminal identification information. Further, in some cases, false information can be distributed. Further, an act to activate a detonator of explosives through the network can be stopped. As described above, intervention in some sort of act made by a portable communication terminal through the network through the wireless LAN communication spot can be made. Accordingly, an investigating authority or the like can minimally, intervene in the communication without unnecessarily violating the privacy of communication, and can give consideration to privacy.

A second invention is an information processing system having a wireless communication device and a person identifying information acquisition device installed at or near a gate, and which identifies communication terminal identification information of a portable communication terminal used by a person who passes through the gate, the wireless communication device being set to perform communication with the portable communication terminal used by the person who passes through the gate, the information processing system including: a communication terminal identification information storage unit configured to store the communication terminal identification information of the portable communication terminal that performs communication using the wireless communication device; a person collation processing unit configured to perform collation as to whether there is a person registered in advance using person identifying information acquired in the person identifying information acquisition device; and a candidate information identifying processing unit configured to perform processing for identifying, from the communication terminal identification information storage unit, the communication terminal identification information of the portable communication terminal of the user who performs communication using the wireless communication device, by extracting the communication terminal identification information corresponding to the person identifying information from the communication terminal identification information storage unit, when existence of the person registered in advance is determined as a result of the collation.

If the setting is made such that the person who passes through a gate and the wireless communication device can perform communication like the present invention, the wireless communication device and the portable communication terminal capable of performing communication can be made to correspond to each other on a one-to-one basis. Therefore, when a person passes through the gate, collation processing for determining whether the person is registered in advance is performed by the person identifying information acquisition device such as a camera based on the person identifying information. As a result, when registration of the person in advance is determined, the communication terminal identification information of the portable communication terminal of that person can be promptly identified.

The above-described invention can be configured like an information processing system, wherein a sensor is installed at or near the gate, and passage of the gate and the acquisition processing of the person identifying information acquisition device are linked, or the processing for acquiring the communication terminal identification information of the portable communication terminal used by the user who passes through the gate in the wireless communication device and the acquisition processing of the person identifying information acquisition device are linked.

With such a configuration, processing for acquiring the person identifying information, and passage through the gate or acquisition of the communication terminal identification information can be linked in the person identifying information acquisition device. Therefore, the person identifying information to be acquired can be decreased. As a result, the high-loaded processing for collating the person identifying information can be decreased, a load of a computer can be decreased, and a processing speed can be increased.

The above-described invention can be configured like an information processing system, wherein the collation processing using the person identifying information acquired in the person identifying information acquisition device is executed by collating the person identifying information and bio-information of the person registered in advance.

In the collation processing of the person identifying information, collation with the bio-information of a person is favorable, like the present invention. The intervention in the communication is led to the restrictions on the privacy of communication and is associated with the serious violation of rights, and thus the intervention should be carefully implemented. Especially, intervention in communication of a person who is different from a registered person should be minimized. Therefore, by using highly reliable information like the bio-information as an object to be collated, wrong recognition of a person can be decreased.

A fifth invention is an information processing system that identifies communication terminal identification information of a user who performs communication with a portable communication terminal using a wireless communication device, the information processing system including: a communication terminal identification information storage unit configured to store the communication terminal identification information of the portable communication terminal that performs communication using the wireless communication device; a person identifying information comparison processing unit configured to determine whether there is a same person using at least two or more pieces of person identifying information acquired in a person identifying information acquisition device in a wireless LAN communication spot where the wireless communication device exists; and a communication terminal identification information narrowing-down processing unit configured to perform, from the communication terminal identification information storage unit, processing for narrowing down the communication terminal identification information of the portable communication terminal of the user who performs communication using the wireless communication device, by extracting pieces of communication terminal identification information corresponding to the respective pieces of person identifying information from the communication terminal identification information storage unit, and identifying common communication terminal identification information, when existence of the same person is determined as a result of the determination.

In the above-described inventions, information to be collated needs to be registered in advance. However, such information cannot be necessarily obtained. Therefore, even if such information is not registered, it is favorable if the communication terminal identification information of the portable communication terminal can be obtained. Therefore, like the present invention, whether there is the same person is determined using at least two or more pieces of person identifying information. Then, the communication terminal identification information corresponding to the person identifying information with which the same person can be determined is identified, and the communication terminal identification information common in the person identifying information is narrowed down, so that the communication terminal identification information of the portable communication terminal used by the user can be identified.

Then, similarly to the first invention, the communication between the wireless communication device and the portable communication terminal can be interrupted or intercepted based on the identified communication terminal identification information. Further, in some cases, false information can be distributed. Further, an act to activate a detonator of explosives through the network can be stopped. As described above, intervention in some sort of act made by the portable communication terminal through the network through the wireless LAN communication spot can be made. Accordingly, an investigating authority or the like can minimally intervene in the communication without unnecessarily violating the privacy of communication, and can give consideration to privacy.

A sixth invention is an information processing method for identifying communication terminal identification information of a user who performs communication with a portable communication terminal using a wireless communication device, the information processing method including, in a computer, the steps of: acquiring the communication terminal identification information of the portable communication terminal that performs communication using the wireless communication device; performing collation as to whether there is a person registered in advance using person identifying information acquired in a person identifying information acquisition device in a wireless LAN communication spot where the wireless communication device exists; identifying the communication terminal identification information as candidate information, by extracting the communication terminal identification information corresponding to the person identifying information, of the acquired communication terminal identification information, when existence of the person registered in advance is determined as a result of the collation; and performing processing for narrowing down the communication terminal identification information of the portable communication terminal of the user who performs communication using the wireless communication device, by identifying common communication terminal identification information, from at least two or more pieces of the candidate information for a same person.

The information processing system of the first invention can be executed by using a computer like the present invention.

A seventh invention is an information processing method for identifying communication terminal identification information of a portable communication terminal used by a person who passes through a gate, where a wireless communication device and a person identifying information acquisition device are installed at or near the gate, the wireless communication device being set to perform communication with the portable communication terminal used by the person who passes through the gate, the information processing method including, in a computer, the steps of: acquiring the communication terminal identification information of the portable communication terminal that performs communication using the wireless communication device; performing collation as to whether there is a person registered in advance using person identifying information acquired in the person identifying information acquisition device; and performing processing for identifying the communication terminal identification information of the portable communication terminal of the user who performs communication using the wireless communication device, by extracting the communication terminal identification information corresponding to the person identifying information, of the acquired communication terminal identification information, when existence of the person registered in advance is determined as a result of the collation.

The information processing system of the second invention can be executed by using a computer like the present invention.

An eighth invention is an information processing method for identifying communication terminal identification information of a portable communication terminal using a wireless communication device, of when there are two or more wireless LAN communication spots, each of the wireless LAN communication spots including the wireless communication device and a camera that captures a part or a whole of a communicative range of the wireless communication device, the information processing method including, in a computer, the steps of: acquiring image information captured by the camera in a first wireless LAN communication spot; acquiring image information captured by the camera in a second wireless LAN communication spot; collating the acquired pieces of image information and bio-information of a person registered in advance, and performing collation as to whether the registered person is captured in the image information; and when the registered person is determined to be captured, comparing the communication terminal identification information of the portable communication terminal that performs communication using the first wireless LAN communication spot, and the communication terminal identification information of the portable communication terminal that performs communication using the second wireless LAN communication spot, corresponding to the determined image information, and identifying common communication terminal identification information.

As shown in the present invention, it is favorable to collate the image information obtained by capturing a part or all of the communicative range of the wireless communication device using the camera and face image information of the person registered in advance. If the same person is collated in the wireless LAN communication spots in two or more places, and a common ground can be found in the communication terminal identification information of the portable communication terminal, the communication terminal identification information has a high possibility of being used by the collated person. Therefore, with the configuration like the present invention, the communication terminal identification information of the person registered in advance can be identified.

A ninth invention is an information processing method for identifying communication terminal identification information of a portable communication terminal using a wireless communication device, of a wireless LAN communication spot including the wireless communication device and a camera that captures apart or a whole of a communicative range of the wireless communication device, the information processing method including, in a computer, the steps of: acquiring image information captured by the camera at a first point of time; acquiring image information captured by the camera at a second point of time; collating the acquired pieces of image information and bio-information of a person registered in advance, and performing collation as to whether the registered person is captured in the image information; and when the registered person is determined to be captured, comparing the communication terminal identification information of the portable communication terminal that performs communication using the wireless LAN communication spot at the first point of time, and the communication terminal identification information of the portable communication terminal that performs communication using the wireless LAN communication spot at the second point of time, corresponding to the determined image information, and identifying common communication terminal identification information.

As shown in the present invention, it is favorable to collate the image information obtained by capturing a part or all of the communicative range of the wireless communication device using the camera and face image information of the person registered in advance. If the same person is collated at two points of time in the wireless LAN communication spot, and a common ground can be found in the communication terminal identification information of the portable communication terminal, the communication terminal identification information has a high possibility of being used by the collated person. Therefore, with the configuration like the present invention, the communication terminal identification information of the person registered in advance can be identified.

A tenth invention is an information processing method for identifying communication terminal identification information of a portable communication terminal using a wireless communication device, of when there are two or more wireless LAN communication spots, each of the wireless LAN communication spots including the wireless communication device and a camera that captures a part or a whole of a communicative range of the wireless communication device, the information processing method including, in a computer, the steps of: acquiring image information captured by the camera in a first wireless LAN communication spot; acquiring image information captured by the camera in a second wireless LAN communication spot; extracting face image information of a captured person from the acquired pieces of image information, and determining whether a same person is captured in each of the image information, by comparing the extracted face image information of a person and the face image information of a person extracted from the other image information; and when the same person is determined to be captured in each of the image information, comparing the communication terminal identification information of the portable communication terminal that performs communication using the first wireless LAN communication spot, and the communication terminal identification information of the portable communication terminal that performs communication using the second wireless LAN communication spot, corresponding to the pieces of image information, and identifying common communication terminal identification information.

An eleventh invention is an information processing method for identifying communication terminal identification information of a portable communication terminal using a wireless communication device, of a wireless LAN communication spot including the wireless communication device and a camera that captures apart or a whole of a communicative range of the wireless communication device, the information processing method including, in a computer, the steps of: acquiring image information captured by the camera at a first point of time; acquiring image information captured by the camera at a second point of time; extracting face image information of a captured person from the acquired pieces of image information, and determining whether a same person is captured in each of the image information, by comparing the extracted face image information of a person and the face image information of a person extracted from the other image information; and when the same person is determined to be captured in each of the image information, comparing the communication terminal identification information of the portable communication terminal that performs communication using the wireless LAN communication spot at the first point of time, and the communication terminal identification information of the portable communication terminal that performs communication using the wireless LAN communication spot at the second point of time, corresponding to the respective pieces of image information, and identifying common communication terminal identification information.

The information processing system of the fifth invention can be executed by using a computer like the inventions.

Advantageous Effects of Invention

According to the present invention, when a person registered in advance is performing communication through a public wireless LAN in a wireless LAN communication spot, communication terminal identification information of the person can be identified. Accordingly, for example, when a person registered to be at a high risk for criminal wrongdoing is performing communication through the public wireless LAN in the wireless LAN communication spot, the communication can be identified. Therefore, intervention in the communication through the wireless LAN communication spot, such as interruption or interception of the communication, distribution of false information, and stop of activation of a detonator of explosives through the network becomes possible, and the invention can be used for prevention of the criminal wrongdoing.

Although the communication terminal identification information can be falsified, usually, the falsification requires a certain operation, and when the person goes out, the person usually uses the same "falsified" communication terminal identification information at least for the day. Therefore, even if the communication terminal identification information is falsified, intervention in the communication can be made by use of the present invention.

BRIEF DESCRIPTION OF DRAWINGS

FIG. 4 is a diagram schematically illustrating an example of a communication terminal identification information storage unit.

FIG. 7 is a diagram schematically illustrating an example of a communication terminal identification information storage unit in Second Example.

DESCRIPTION OF EMBODIMENTS

Figure 1:
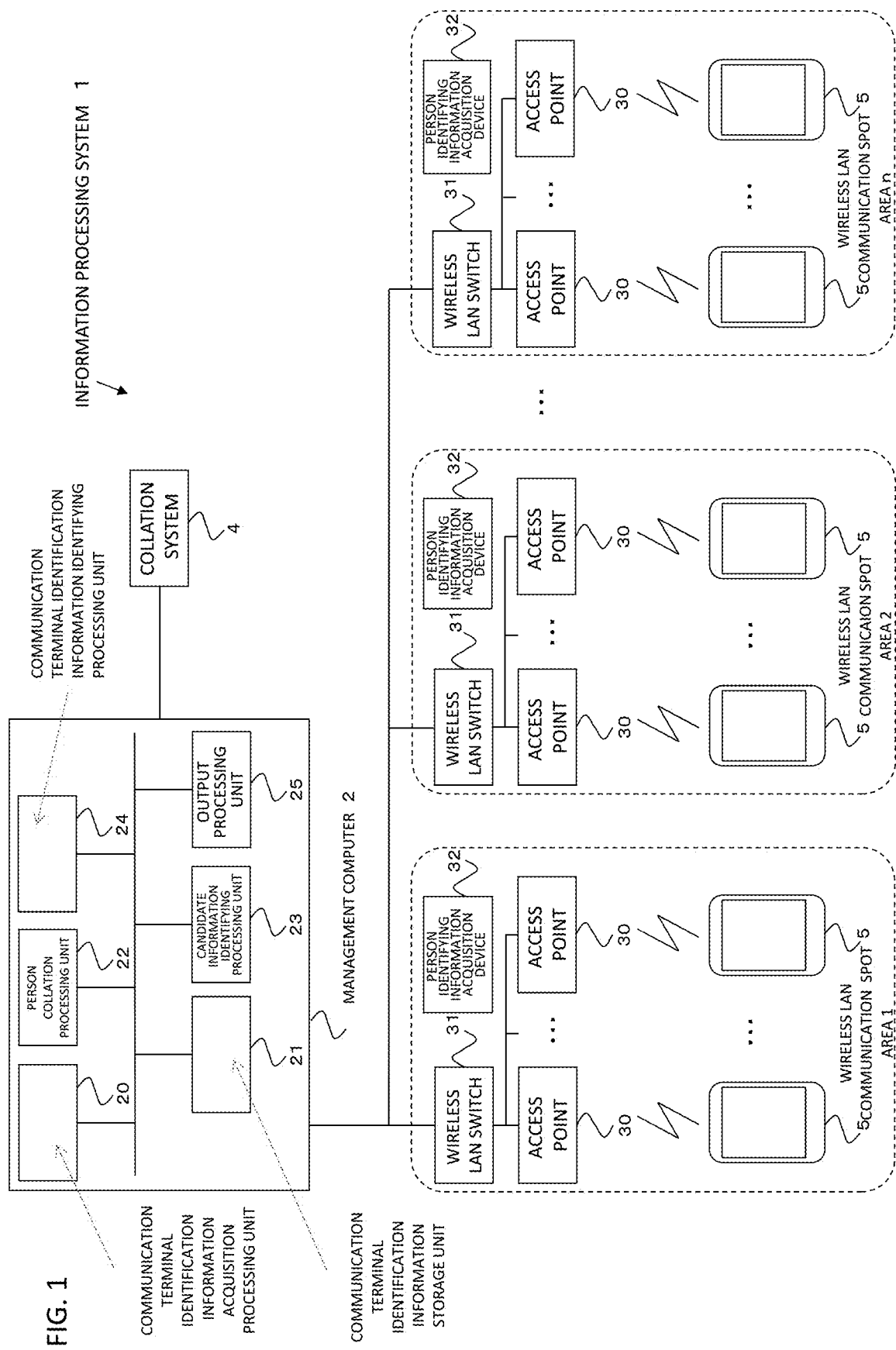
FIG. 1 is a conceptual diagram schematically illustrating an example of an overall configuration of an information processing system of the present invention.

An example of an overall configuration of an information processing system 1 of the present invention is schematically illustrated in FIG. 1. The information processing system 1 includes a management computer 2 used by a company or the like that manages the present system, and communication devices of various types of wireless LANs in wireless LAN communication spots. Further, the management computer 2 can perform communication with a collation system 4 described below.

Figure 2:
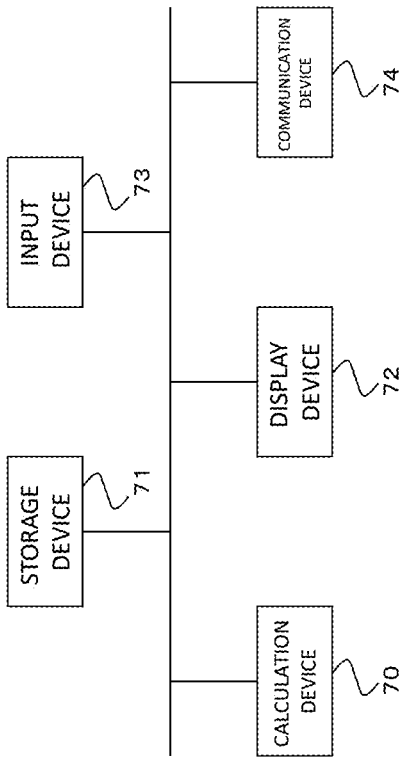
FIG. 2 is a diagram schematically illustrating an example of a hardware configuration of a computer.

The management computer 2 and the collation system 4 are realized by various types of computers such as a server and a personal computer. FIG. 2 illustrates an example of a hardware configuration of a computer. The computer that is the management computer 2 and the collation system 4 includes a calculation device 70 such as a CPU that executes calculation processing of a program, a storage device 71 such as a RAM and a hard disk that store information, a display device 72 such as a display, an input device 73 such as a keyboard and a pointing device (a mouse and numeric keys), and a communication device 74 that transmits/receives a processing result of the calculation device 70 and the information stored in the storage device 71 through a network such as the Internet or a LAN.

Note that FIG. 1 illustrates a case in which the management computer 2 is realized by one computer. However, functions of the management computer 2 may be distributed and arranged in a plurality of computers, and realized. Further, functions of means in the present invention are merely logically distinguished, and may form the same region in a physical or real sense.

Functions of processing units and the storage unit in the present invention are logically distinguished, and may form the same region in a physical or real sense. Further, a data file may be employed in place of a database, and description of the database includes the data file.

The wireless LAN communication spot includes an access point 30 that performs communication with a portable communication terminal 5 used by a user through a wireless LAN, a wireless LAN switch 31 that manages one, or two or more access points 30, and a person identifying information acquisition device 32 that acquires person identifying information for identifying the user of the portable communication terminal 5 around the wireless LAN communication spot. Note that at least a plurality of the wireless LAN communication spots is favorably provided in arbitrary places. However, the number of the wireless LAN communication spots may be one.

The access point 30 is a device for the portable communication terminal 5 to perform communication through the wireless LAN in the wireless LAN communication spot, and performs the wireless communication with the portable communication terminal 5. Further, the access point 30 performs communication with the wireless LAN switch 31 described below by wired or wireless means. That is, the access point 30 relays communication between the portable communication terminal 5 and the wireless LAN switch 31.

The wireless LAN switch 31 acquires communication terminal identification information for identifying the portable communication terminal 5 such as a MAC access or the user of the portable communication terminal 5 from the portable communication terminal 5 through the access point 30, and manages the communication terminal identification information. The communication terminal identification information may be any information as long as the information identifies the portable communication terminal 5 or the user thereof in addition to the MAC address, and may be a user ID for using the wireless LAN communication spot, for example. Note that, in a case of using information that is not directly used for the communication with the portable communication terminal 5 like the MAC address as the communication terminal identification information, the communication terminal identification information maintains a relationship with information used for communication between the wireless LAN switch 31 and the portable communication terminal 5.

In the wireless LAN communication spot, a configuration to perform communication between the wireless LAN communication spot and the management computer 2 through the wireless LAN switch 31 will be described. However, the access point 30 may have a function equivalent to the wireless LAN switch 31 without using the wireless LAN switch 31. In this case, the access point 30 may acquire and hold the communication terminal identification information of the portable communication terminal 5 that is performing communication with the access point 30. In the description of the present invention, the access point 30 relays the communication between the portable communication terminal 5 and the wireless LAN switch 31 even though no explicitly stated. The access point 30 and/or the wireless LAN switch 31 in the wireless LAN communication spot are referred to as wireless communication device.

The person identifying information acquisition device 32 is a device that acquires the person identifying information of a person who is in a communication range of the wireless LAN communication spot and is performing communication through the wireless LAN with the portable communication terminal 5. The person identifying information is information used to identify an individual using an appearance or a physical characteristic of human. Further, the person identifying information acquisition device 32 is a device that acquires the person identifying information.

For example, as the person identifying information acquisition device 32, a security camera can be used. As the person identifying information, image information (a still image or a moving image) of when a person or the like existing in a communicative range of the wireless LAN communication spot is captured by the camera can be used. Further, as an example of the person identifying information acquisition device 32, there is a capturing device (camera), a microphone, a reading device of fingerprint or palmprint, a reading device of vein or iris, or a reading device of gene information. As the person identifying information, there is a voiceprint (voice information), a fingerprint, a palmprint, a vein, an iris, information of gene, or the like.

Note that, in a case of using the capturing device such as a security camera as the person identifying information acquisition device 32, capturing the face from the front to the extent possible improves accuracy of recognition. Therefore, it is favorable if the capturing device is installed in a position where the user can be captured near from the front. For example, the capturing device may be installed near the front of means of transportation such as a bus or a train, a doorway of a facility, or a security gate 6 described below.

The person identifying information acquired by the person identifying information acquisition device 32 and the communication terminal identification information acquired by the wireless LAN switch 31 are sent to the management computer 2.

The management computer 2 includes a communication terminal identification information acquisition processing unit 20, a communication terminal identification information storage unit 21, a person collation processing unit 22, a candidate information identifying processing unit 23, a communication terminal identification information identifying processing unit 24, and an output processing unit 25.

The communication terminal identification information acquisition processing unit 20 acquires the communication terminal identification information received from the portable communication terminal 5, from the access point 30 or the wireless LAN switch 31 in the wireless LAN communication spot. At this time, to identify from which access point 30 or wireless LAN switch 31 the communication terminal identification information has been acquired, it is favorable to acquire the communication terminal identification information together with identification information of the access point 30, the wireless LAN switch 31, and the wireless LAN communication spot where the access point 30 and the wireless LAN switch 31 are installed. Further, date and time information when the communication terminal identification information has been acquired is also acquired.

The communication terminal identification information storage unit 21 stores the communication terminal identification information, the date and time information, and the identification information of the access point 30, the wireless LAN switch 31, or the wireless LAN communication spot in association with one another. FIG. 4 schematically illustrates an example of the communication terminal identification information storage unit 21.

The person collation processing unit 22 sends the person identifying information acquired from the person identifying information acquisition device 32 in the wireless LAN communication spot to the collation system 4, and collates the person identifying information with the information of the person registered in advance. When an investigating authority uses the collation system 4, and the investigating authority has registered face image information, the person collation processing unit 22 acquires the image information from the person identifying information acquisition device 32 serving as a capturing device as the person identifying information. Here, the image information obtained by capturing the communicative range of the wireless LAN communication spot by the capturing device is sent. Then, the person collation processing unit 22 executes collation processing of determining whether the face image information of the person registered in advance is included in the image information by sending the acquired image information to the collation system. 4 used by the investigating authority. The collation system 4 performs collation as to whether the face image information registered in the collation system 4 of the investigating authority in advance is included in the image information based on the image information acquired from the management computer 2, by performing matching processing with face. If inclusion of the registered face image information is determined, the collation system 4 returns attribute information of the person of the hit face image information to the management computer 2 as a result. Further, the collation system 4 returns information that indicates which image information the face image information is included in, for example, the identification information of the wireless LAN communication spot and the date and time information as results. The attribute information of the person and the like are acquired in the person collation processing unit 22.

The candidate information identifying processing unit 23 extracts and identifies the communication terminal identification information corresponding to the image information, of which the result of the attribute information of the person has been received from the collation system 4, from the communication terminal identification information storage unit 21. That is, since the communication terminal identification information managed in the access point 30 or the wireless LAN switch 31, of each wireless LAN communication spot, is stored in the communication terminal identification information storage unit 21, the communication terminal identification information at the date and time corresponding to the date and time information of the image information may just be extracted from the communication terminal identification information storage unit 21 and identified.

For example, assume that, when the person collation processing unit 22 sends the image information captured by the person identifying information acquisition device 32 (camera) in an area 1 to the collation system 4 and the collation processing is executed, inclusion of the face image information of the person registered in advance is determined, and the person collation processing unit 22 has received the attribute information of the person from the collation system 4. Then, since there is collation with the person registered in advance, the candidate information identifying processing unit 23 extracts the communication terminal identification information of the area 1 from the communication terminal identification information storage unit 21 based on the image information of the area 1. The candidate information identifying processing unit 23 then identifies the communication terminal identification information (in a predetermined range including the data and time information) corresponding to the image information, of the extracted communication terminal identification information, as candidate information.

As an example, in a case of the image information captured at 10:01:15 on Jan. 20, 2016, the communication terminal identification information "12-34-56-78-90-12", "34-56-78-90-12-34", "56-78-90-12-34-56", and "78-90-12-34-56-78" in a predetermined range, for example, around five minutes of the date and time are extracted from the image information, and identified as the candidate information.

As described above, when the processing of collating a person using the person identifying information, and the person registered in advance can be identified, the communication terminal identification information of the portable communication terminal 5 that has been using the access point 30 at that time is identified, so that the candidates of the communication terminal identification information of the portable communication terminal 5 used by the collated person can be identified.

The communication terminal identification information identifying processing unit 24 compares the candidate information of at least two or more pieces of the communication terminal identification information where the collated persons are the same, and performs processing of narrowing down common communication terminal identification information. For example, assume that, as a result of collating a person "A", the candidate information of the communication terminal identification information is acquired in the area 1, an area 2, and an area 3. Assume that respective pieces of the candidate information at this time are the pieces of the communication terminal identification information illustrated in FIG. 4.

Then, the common communication terminal identification information, of the candidate information of the area 1, the candidate information of the area 2, and the candidate information of the area 3, is only "12-34-56-78-90-12". Then, the communication terminal identification information of the portable communication terminal 5 used by the person "A" can be identified as "12-34-56-78-90-12".

Although it is favorable to narrow down the communication terminal identification information until the number of pieces of the information becomes 1, it cannot necessarily happen. Therefore, when there is a plurality of pieces of the communication terminal identification information common to a plurality of pieces of the candidate information, it is enough to identify the pieces of the communication terminal identification information as the narrowing-down processing.

The output processing unit 25 outputs the result of narrowing-down in the communication terminal identification information identifying processing unit 24 and the attribute information of the person in the collation result received from the collation system 4 by the person collation processing unit 22. For example, information that the person "A" is using the portable communication terminal 5 in the areas 1, 2, and 3, and the communication terminal identification information is "12-34-56-78-90-12" is output to the display device 72 of the management computer 2 and the like. Note that the information may be output in a printing device or a notification output may be provided to a predetermined notification destination in an electronic mail or message system, other than the output to the display device 72. Further, the information may be notified to a predetermined notification destination of an authority that manages the collation system 4, such as the investigating authority.

The collation system 4 stores and manages a part or the whole of the bio-information of the person registered in advance in association with the attribute information of the person. The collation system 4 determines whether there is an appropriate person by collating the person identifying information sent from the management computer 2 and the bio-information of the person registered in advance, and returns a result of the determination to the management computer 2. As the bio-information, there is the face image information of a person, a voiceprint (voice information), a fingerprint, a palmprint, a vein, an iris, information of gene, or the like.

The investigating authority such as police may manage the collation system 4 for the purposes of criminal investigation and maintenance of security. Further, for another purpose, an authority that implements the purpose may manage the collation system 4. Note that the function of the collation system 4 may be given to the person collation processing unit 22, instead of being an independent system. In that case, processing for collating the person identifying information and the bio-information is performed in the person collation processing unit 22.

First Example

Figure 5:
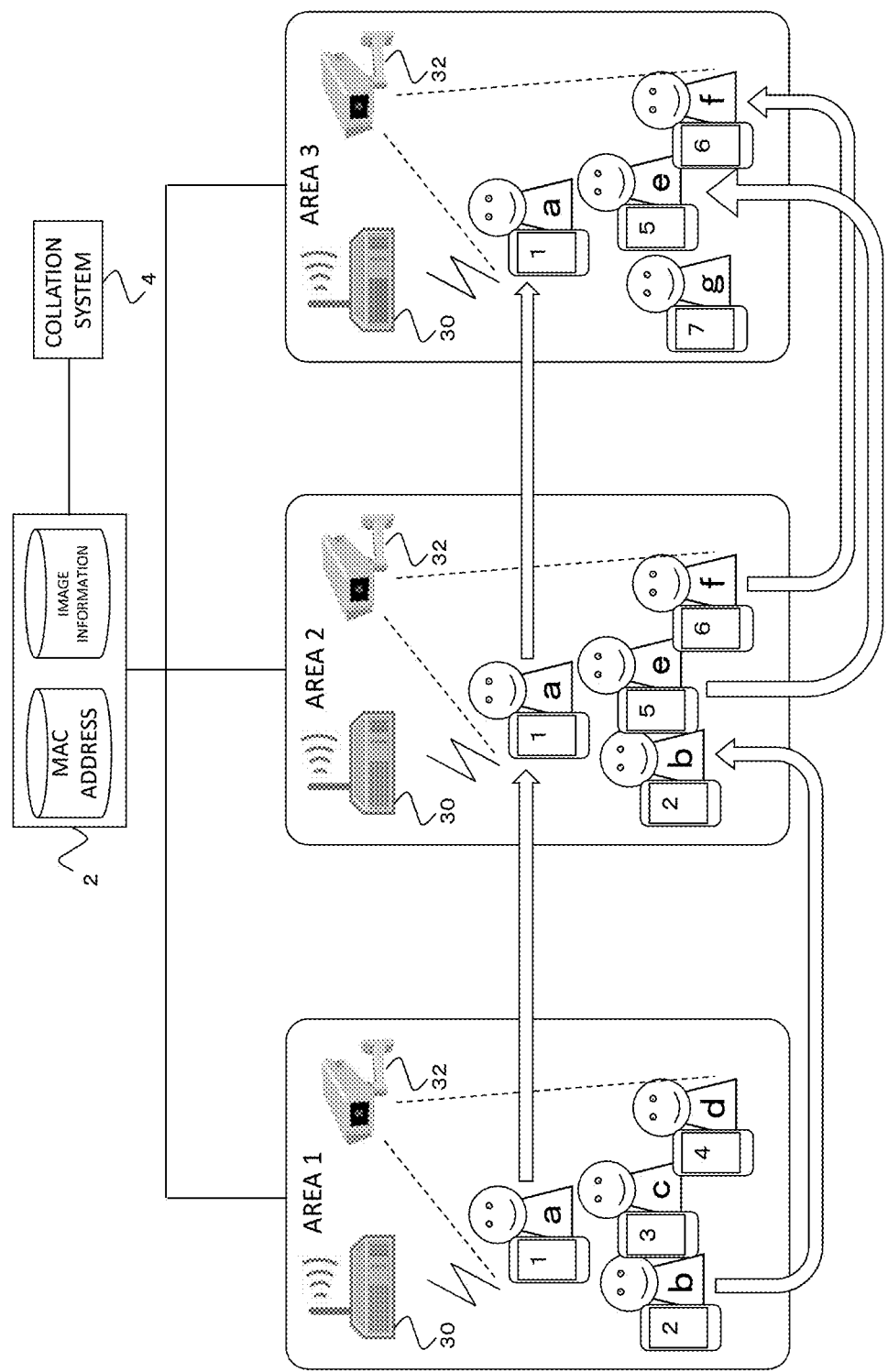
FIG. 5 is a diagram schematically illustrating an example of an embodiment in First Example.

In an embodiment below in an information processing system 1 of the present invention, a case will be described, in which wireless LAN communication spots are installed in three places in a certain event site, a security camera is used as a person identifying information acquisition device 32, image information obtained by capturing a part or the whole of a communicative range of a wireless LAN communication spot by the security camera is used as person identifying information, and face image information is used as bio-information. An example of an embodiment in First Example is schematically illustrated in FIG. 5.

In the present embodiment, areas 1 to 3 are provided as the wireless LAN communication spots, and access points 30, wireless LAN switches 31, and security cameras are installed in the respective areas. The access point 30 relays communication between a portable communication terminal 5 and the wireless LAN switch 31, and a MAC address that is communication terminal identification information of the portable communication terminal 5 is managed in the wireless LAN switch 31.

Members of persons in the areas 1 to 3 vary over time. That is, FIG. 5 illustrates a case in which there are four persons (users "a" to "d") in the area 1 at a certain point of time, there are four persons (the users "a", "b", "e", and "f") in the area 2 after passage of a predetermined time from the certain point of time, and there are four persons (the users "a", "e", "f", and "g") in the area 3 after passage of a predetermined time from the second point of time. That is, the users "a" and "b" initially existing in the area 1 move to the area 2, and the user "a" further moves to the area 3.

Further, in the areas 1 to 3, MAC addresses as the communication terminal identification information are recorded in the wireless LAN switches 31 at the respective points of time, and the security cameras capture images. Then, the MAC addresses and the image information are sent to a management computer 2.

Figure 3:
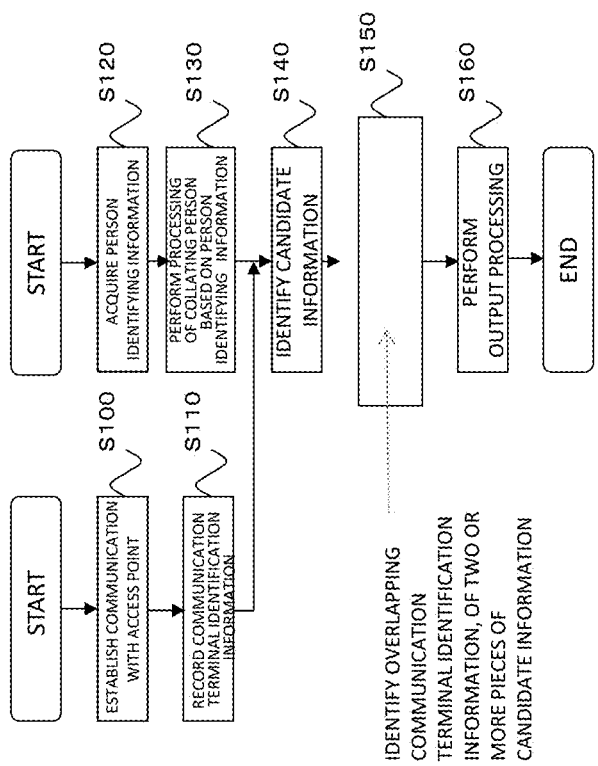
FIG. 3 is a flowchart schematically illustrating an example of processing of an information processing system of the present invention.

Hereinafter, an example of a processing process in the present embodiment will be described using the flowchart of FIG. 3.

First, when a user is positioned in a communicative range of the access point 30 of the area 1 that is the wireless LAN communication spot, communication between the portable communication terminal 5 used by the user and the wireless LAN switch 31 is established (S100), and the MAC address of the portable communication terminal 5 is sent to the wireless LAN switch 31 through the access point 30. Then, the wireless LAN switch 31 transmits information that identifies the wireless LAN communication spot, date and time information, and the MAC address to the management computer 2, and a communication terminal identification information acquisition processing unit 20 of the management computer 2 that has received the information stores the information to a communication terminal identification information storage unit 21 (S110).

In the case of FIG. 5, in the area 1, the users "a" to "d" respectively use the first to fourth portable communication terminals 5, and the MAC addresses "12-34-56-78-90-12", "34-56-78-90-12-34", "56-78-90-12-34-56", and "78-90-12-34-56-78" of the respective portable communication terminals 5 are sent to the wireless LAN switch 31 together with "area 1" that indicates the wireless LAN communication spot, and the date and time information. The communication terminal identification information acquisition processing unit 20 that has received the information stores the information to the communication terminal identification information storage unit 21.

Meanwhile, the security camera in the area 1 captures a moving image or a still image, and acquires the image information (S120). The security camera then transmits the acquired image information to the management computer 2 together with the information that identifies the wireless LAN communication spot, the date and time information of the captured date and time, and the like.

A person collation processing unit 22 of the management computer 2 transmits the acquired image information to the collation system 4, and executes the collation processing for performing collation as to whether the face image information of a person registered in advance is included in the image information (S130). As the collation processing, a technology such as known face recognition processing can be used.

As a result of collation, when inclusion of the face image information of a person registered in advance is determined, attribute information of the person, the information that identifies the wireless LAN communication spot, and the like are returned from a collation system 4, as a collation result, and are acquired by the person collation processing unit 22. If a person "a" is collated, a part or the whole of the attribute information stored in the collation system 4, such as the name of the person "a", is sent from the collation system 4 to the management computer 2 together with the information of the "area 1" that identifies the wireless LAN communication spot, as a collation result.

Upon receipt of the collation result in the person collation processing unit 22, a candidate information identifying processing unit 23 then extracts the MAC address corresponding to the date and time information of the image information, of which the attribute information of the person "a" in the "area 1" has been determined, from the communication terminal identification information storage unit 21, as candidate information (S140). For example, the candidate information identifying processing unit 23 extracts the four MAC addresses of the "area 1" in FIG. 4.

While the processing for the area 1 is executed as described above, the users move from place to place overtime. Then, assume that the users "a" and "b" existing in the area 1 move to the area 2, and the users "a", "b", "e", and "f" exist in the area 2. Even in this case, the wireless LAN switch 31 in the area 2 establishes connection with the portable communication terminals 5 of the respective users through the access point 30 (S100), and acquires the MAC addresses, so that the MAC addresses are stored in the communication terminal identification information storage unit 21 of the management computer 2 (S110). Further, the security camera in the area 2 captures an image (S120), and the image information is sent to the person collation processing unit 22 (S130).

The person collation processing unit 22 sends the image information of the area 2 to the collation system 4, similarly to the image information of the area 1 above, and the processing for collating the person is executed in the collation system 4 (S130). Here, the user "a" is still captured in the image, and thus a part or the whole of the attribute information stored in the collation system 4, such as the name of the user "a", is sent from the collation system 4 to the management computer 2 together with information of "area 2" that identifies the wireless LAN communication spot, as a collation result.

Upon receipt of the collation result in the person collation processing unit 22, the candidate information identifying processing unit 23 then extracts the MAC address corresponding to the date and time information of the image information, of which the attribute information of the user "a" in the "area 2" has been determined, from the communication terminal identification information storage unit 21, as the candidate information (S140). For example, the candidate information identifying processing unit 23 extracts the four MAC addresses of the "area 2" in FIG. 4.

Further, assume that the users "a", "e", "f", and "g" exist in the area 3 over time. Even in this case, the wireless LAN switch 31 in the area 3 establishes connection with the portable communication terminals 5 of the respective users through the access point 30 (S100), and acquires the MAC addresses, so that the MAC addresses are stored in the communication terminal identification information storage unit 21 of the management computer 2 (S110). Further, the security camera in the area 3 captures an image (S120), and the image information is sent to the person collation processing unit 22 (S130).

The person collation processing unit 22 sends the image information of the area 3 to the collation system 4, similarly to the image information of the areas 1 and 2, and the processing for collating a person is executed in the collation system 4 (S130). Here, the user "a" is still captured in the image, and thus a part or the whole of the information stored in the collation system 4, such as the name of the user "a", is sent from the collation system 4 to the management computer 2 together with information of "area 3" that identifies the wireless LAN communication spot, as a collation result.

Upon receipt of the collation result in the person collation processing unit 22, the candidate information identifying processing unit 23 then extracts the MAC address corresponding to the date and time information of the image information, of which the attribute information of the user "a" in the "area 3" has been determined, from the communication terminal identification information storage unit 21, as the candidate information (S140). For example, the candidate information identifying processing unit 23 extracts the four MAC addresses of the "area 3" in FIG. 4.

When the common person "a" is identified as described above, a communication terminal identification information identifying processing unit 24 identifies an overlapping MAC address from the candidate information of two or more MAC addresses (S150). In a case where the candidate information of the area 1, the candidate information of the area 2, and the candidate information of the area 3 regarding the person "a" are those in FIG. 4, the overlapping MAC address is "12-34-56-78-90-12". Therefore, the MAC address used by the person "a" can be narrowed down to "12-34-56-78-90-12".

An output processing unit 25 then outputs the attribute information such as the name of the person "a" received from the collation system 4, the narrowed-down MAC address, the information of the "area 1", "area 2", and "area 3" that identify the wireless LAN communication spots to a display device 72 of the management computer 2 (S160).

Note that any timing is acceptable for processing timing of the communication terminal identification information identifying processing unit 24. However, the processing can be performed when a plurality of pieces of the candidate information is acquired about the same person. In this case, when the candidate information for the user "a" in the area 2 is acquired, the communication terminal identification information common to the two pieces of the candidate information (the candidate information of the area 1 and the candidate information of the area 2 for the user "a") is narrowed down. In the case of FIG. 4, the communication terminal identification information is narrowed down to "12-34-56-78-90-12" and "34-56-78-90-12-34". Then, when the candidate information for the user "a" in the area 3 is acquired, whether there is the communication terminal identification information common to the narrowed-down communication terminal identification information is compared, and the narrowing-down processing is executed. In the case of FIG. 4, the communication terminal identification information is narrowed down to "12-34-56-78-90-12".

By executing the above processing process by the information processing system 1, when there is a person registered in advance, the MAC address used by the person as a user can be identified. Therefore, the communication using the portable communication terminal 5 of the person can be interrupted and the like based on the MAC address.

Second Example

Figure 6:
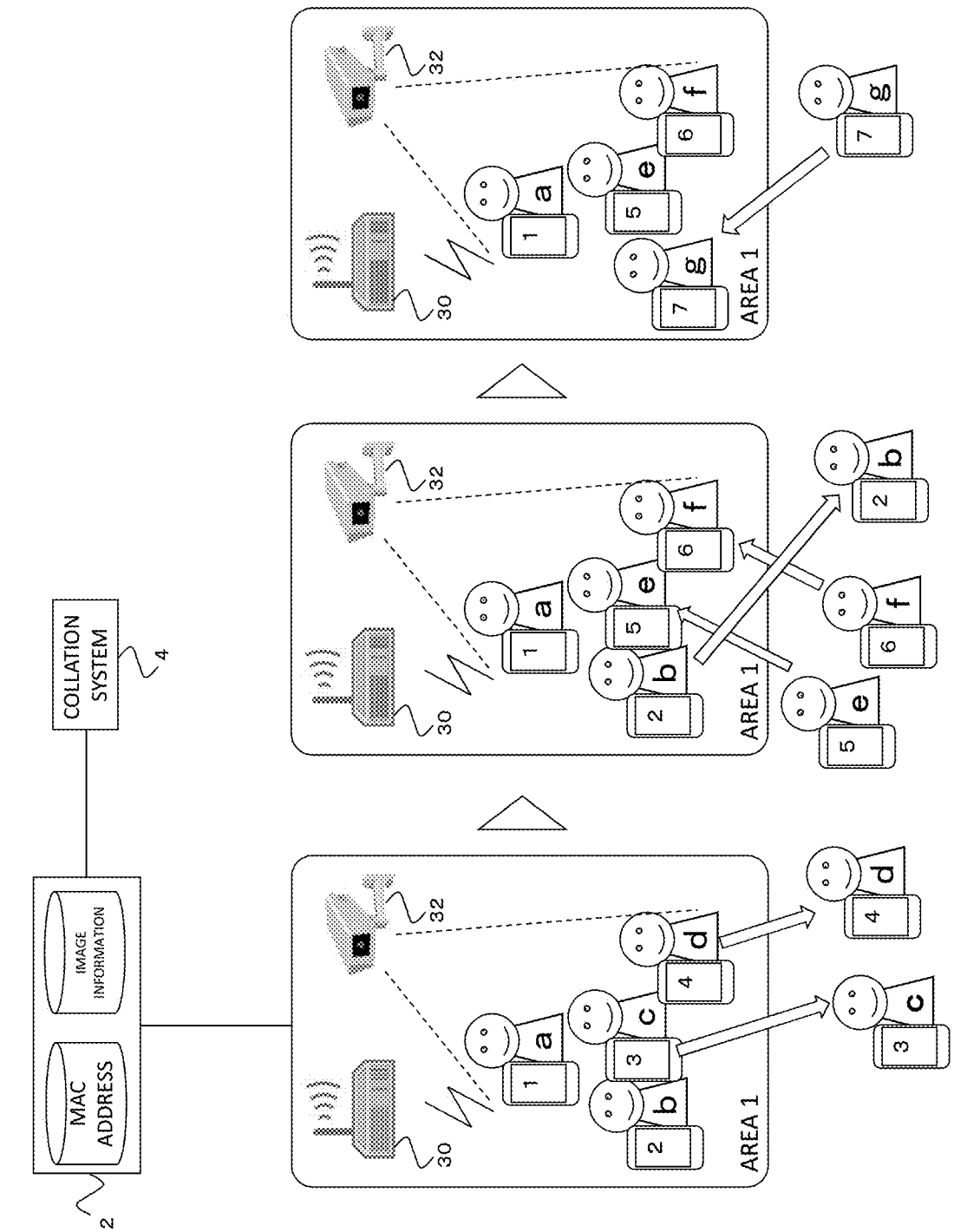
FIG. 6 is a diagram schematically illustrating an example of an embodiment in Second Example.

In a second embodiment a case will be described, in which a wireless LAN communication spots are installed in one place in a certain event site, a security camera is used as a person identifying information acquisition device 32, image information obtained by capturing a part or the whole of a communicative range of the wireless LAN communication spot by the security camera is used as person identifying information, and face image information is used as bio-information. An example of an embodiment in Second Example is schematically illustrated in FIG. 6.

In the present embodiment, an area 1 is provided as the wireless LAN communication spot, and an access point 30, a wireless LAN switch 31, and the security camera are installed in the area 1. Then, the members of persons existing in the area 1 vary over time. That is, FIG. 6 illustrates a case in which there are four persons (users "a" to "d") in the area 1 at a certain point of time, there are four persons (the users "a", "b", "e", and "f") after passage of a predetermined time from the certain point of time, and there are four persons (the users "a", "e", "f", and "g") after passage of a predetermined time from the second point of time. That is, the members of users initially existing in the area 1 are changed from the four users "a" to "d" to the four users "a", "b", "e", and "f" (the users "c" and "d" are gone from the area 1 and the users "e" and "f" enter the area 1), and then to the four users "a", "e" "f", and "g" (the user "b" is gone from the area 1 and the user "g" enters the area 1).

Further, in the area 1, MAC addresses are recorded in the wireless LAN switches 31 at the respective points of time, and the security camera captures images. Then, the MAC addresses and the image information are sent to a management computer 2.

A basic flow of processing is common to First Example. Hereinafter, an example of a processing process in the present embodiment will be described using the flowchart of FIG. 3.

First, when a user is positioned in a communicative range of the access point 30 of the area 1 that is the wireless LAN communication spot, communication between the portable communication terminal 5 used by the user and the wireless LAN switch 31 is established (S100), and the MAC address of the portable communication terminal 5 is sent to the wireless LAN switch 31 through the access point 30. Then, the wireless LAN switch 31 transmits information that identifies the wireless LAN communication spot, date and time information, and the MAC address to the management computer 2, and a communication terminal identification information acquisition processing unit 20 of the management computer 2 that has received the information stores the information to a communication terminal identification information storage unit 21 (S110).

In the case of FIG. 6, in the area 1, the users "a" to "d" respectively use the first to fourth portable communication terminals 5, and the MAC addresses "12-34-56-78-90-12", "34-56-78-90-12-34", "56-78-90-12-34-56", and "78-90-12-34-56-78" of the respective portable communication terminals 5 are sent to the wireless LAN switch 31 together with "area 1" that indicates the wireless LAN communication spot, and the date and time information. The communication terminal identification information acquisition processing unit 20 that has received the information stores the information to the communication terminal identification information storage unit 21.

Meanwhile, the security camera in the area 1 captures a moving image or a still image, and acquires the image information (S120). The security camera then transmits the acquired image information to the management computer 2 together with the information that identifies the wireless LAN communication spot, the date and time information of the captured date and time, and the like.

A person collation processing unit 22 of the management computer 2 transmits the acquired image information to the collation system 4, and executes the collation processing for performing collation as to whether the face image information of a person registered in advance is included in the image information (S130). As a result of collation, when inclusion of the face image information of a person registered in advance is determined, attribute information of the person, the information that identifies the wireless LAN communication spot, and the like are returned from a collation system 4, as a collation result, and are acquired by the person collation processing unit 22. If a person "a" is collated, a part or the whole of the attribute information stored in the collation system 4, such as the name of the person "a", is sent from the collation system 4 to the management computer 2 together with the information of the "area 1" that identifies the wireless LAN communication spot, and the date and time information of the collated image information, as a collation result.

Upon receipt of the collation result in the person collation processing unit 22, a candidate information identifying processing unit 23 then extracts the MAC address corresponding to the date and time information of the image information, of which the attribute information of the person "a" in the "area 1" has been determined, from the communication terminal identification information storage unit 21, as candidate information (S140). For example, the candidate information identifying processing unit 23 extracts the four MAC addresses (the first four MAC addresses) of the "area 1" in FIG. 4.

While the processing for the area 1 is executed as described above, the users move from place to place over time. Assume that the users "c" and "d" leave the area 1, and the users "e" and "f" newly enter the area 1. Even in this case, the wireless LAN switch 31 in the area 1 establishes connection with the portable communication terminals 5 of the newly entering users (S100), and acquires the MAC addresses, so that the MAC addresses are stored in the communication terminal identification information storage unit 21 of the management computer 2 (S110). Further, the security camera in the area 1 captures an image (S120), and the image information is sent to the person collation processing unit 22 (S130).

The person collation processing unit 22 sends the newly captured image information to the collation system 4, similarly to the image information above, and the processing for collating the person is executed in the collation system 4 (S130). Here, the user "a" is still captured in the image, and thus a part or the whole of the attribute information stored in the collation system 4, such as the name of the user "a", is sent from the collation system 4 to the management computer 2 together with information of the "area 1" that identifies the wireless LAN communication spot, and the date and time information of the collated image information, as a collation result.

Upon receipt of the collation result in the person collation processing unit 22, the candidate information identifying processing unit 23 then extracts the MAC address corresponding to the date and time information of the image information, of which the attribute information of the user "a" in the "area 1" has been determined, from the communication terminal identification information storage unit 21, as the candidate information (S140). For example, the candidate information identifying processing unit 23 extracts the four MAC addresses (the fifth to eighth MAC addresses) of the "area 1" in FIG. 4.

Assume that the user "b" leaves the area 1 and the user "g" newly enters the area 1 over time. Even in this case, the wireless LAN switch 31 in the area 1 establishes connection with the portable communication terminals 5 of the newly entering user (S100), and acquires the MAC address, so that the MAC address is stored in the communication terminal identification information storage unit 21 of the management computer 2 (S110). Further, the security camera in the area 1 captures an image (S120), and the image information is sent to the person collation processing unit 22 (S130).

The person collation processing unit 22 sends the newly captured image information to the collation system 4, similarly to the image information above, and the processing for collating the person is executed in the collation system 4 (S130). Here, the user "a" is still captured in the image, and thus a part or the whole of the attribute information stored in the collation system 4, such as the name of the user "a", is sent from the collation system 4 to the management computer 2 together with information of the "area 1" that identifies the wireless LAN communication spot, and the date and time information of the collated image information, as a collation result.

Upon receipt of the collation result in the person collation processing unit 22, the candidate information identifying processing unit 23 then extracts the MAC address corresponding to the date and time information of the image information, of which the attribute information of the user "a" in the "area 1" has been determined, from the communication terminal identification information storage unit 21, as the candidate information (S140). For example, the candidate information identifying processing unit 23 extracts the four MAC addresses (the ninth to twelfth MAC addresses) of the "area 1" in FIG. 4.

When the common person "a" is identified as described above, a communication terminal identification information identifying processing unit 24 identifies an overlapping MAC address from the candidate information of two or more MAC addresses (S150). In a case where three pieces of the candidate information of the area 1 regarding the person "a" are those in FIG. 7, the overlapping MAC address is "12-34-56-78-90-12". Therefore, the MAC address used by the person "a" can be narrowed down to "12-34-56-78-90-12".

An output processing unit 25 then outputs the attribute information such as the name of the person "a" received from the collation system 4, the narrowed-down MAC address, the information of the "area 1" that identifies the wireless LAN communication spot to a display device 72 of the management computer 2 and the like (S160).

By executing the above processing process by the management computer 2, when there is a person registered in advance, the MAC address used by the person can be identified. Therefore, the communication using the portable communication terminal 5 of the person can be interrupted and the like based on the MAC address.

Third Example

In First and Second Examples, the person identifying information acquired from the person identifying information acquisition device 32 (the security camera or the like) in the wireless LAN communication spot is acquired in the person collation processing unit 22 of the management computer 2, and is compared with the bio-information of the person registered in advance in the collation system 4 and the person collation processing unit 22, and the narrowing-down processing of the communication terminal identification information is executed when the comparison is matched. In the present embodiment, a case will be described, in which pieces of person identifying information acquired in a person identifying information acquisition device 32 in a wireless LAN communication spot are compared and whether there is the same person is compared, instead of registering bio-information of a person in advance, and processing for narrowing down communication terminal identification information is executed when existence of the same person is determined.

Figure 8:
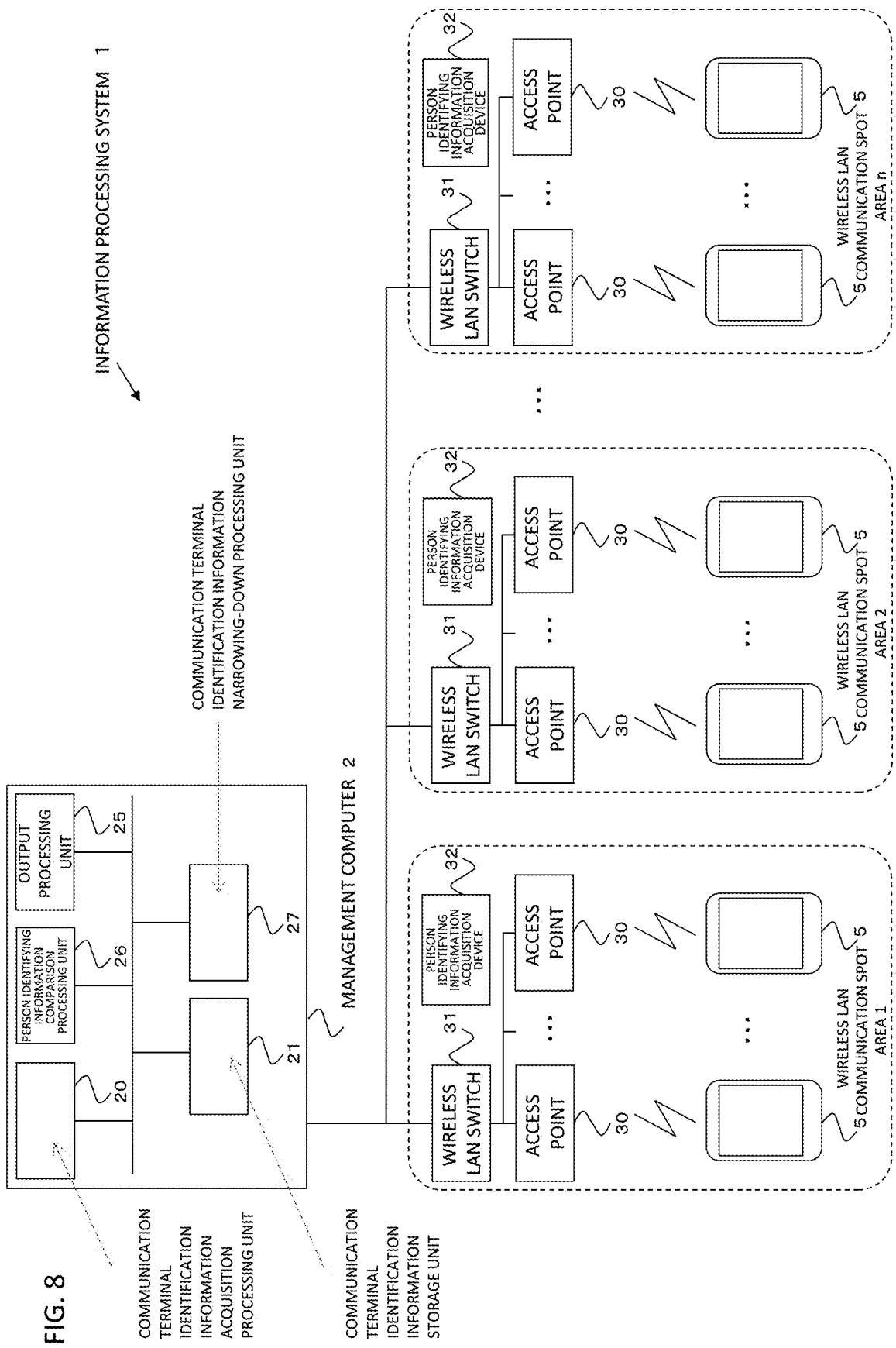
FIG. 8 is a diagram schematically illustrating an example of an embodiment in Third Example.

An example of an entire configuration of an information processing system 1 in the present embodiment is schematically illustrated in FIG. 8. The information processing system 1 in the present embodiment includes a communication terminal identification information acquisition processing unit 20, a communication terminal identification information storage unit 21, a person identifying information comparison processing unit 26, a communication terminal identification information narrowing-down processing unit 27, and an output processing unit 25. The communication terminal identification information acquisition processing unit 20, the communication terminal identification information storage unit 21, and the output processing unit 25 have the same processing as First to Fourth Examples, and thus description is omitted.

The person identifying information comparison processing unit 26 acquires person identifying information acquired in the person identifying information acquisition device 32 in the wireless LAN communication spot, compares at least two or more pieces of the person identifying information, and determines whether there is the same person. At this time, two or more pieces of the person identifying information in the same wireless LAN communication spot may be compared, or two or more pieces of the person identifying information in different wireless LAN communication spots may be compared.

For example, in a case where the person identifying information acquisition device 32 in the wireless LAN communication spot is a security camera that captures a part or the whole of a communicative range of the wireless LAN communication spot, and the person identifying information is image information captured by the security camera, persons captured in the image information are extracted, and whether there is a person common in the extracted persons is determined in the image information as a comparison target using a face image recognition technology.

When existence of the same person is determined in the person identifying information comparison processing unit 26, a communication terminal identification information narrowing-down processing unit 27 extracts pieces of communication terminal identification information corresponding to the respective pieces of the person identifying information from the communication terminal identification information storage unit 21, and overlapping communication terminal identification information is identified.

Figure 9:
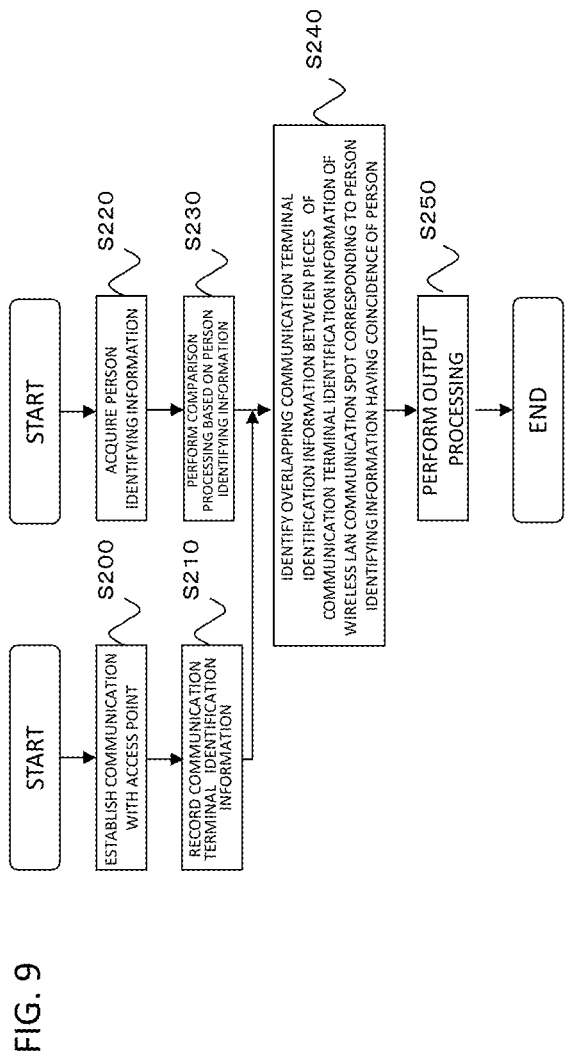
FIG. 9 is a flowchart schematically illustrating an example of processing in Third Example.

Next, an example of processing in the present embodiment will be described using the flowchart of FIG. 9. In the description below, similarly to First Example, the person identifying information acquisition device 32 is the security camera that captures a part or the whole in the communicative range of the wireless LAN spot, and the person identifying information is the image information captured by the security camera. Further, as the communication terminal identification information is a MAC address.

Figure 10:
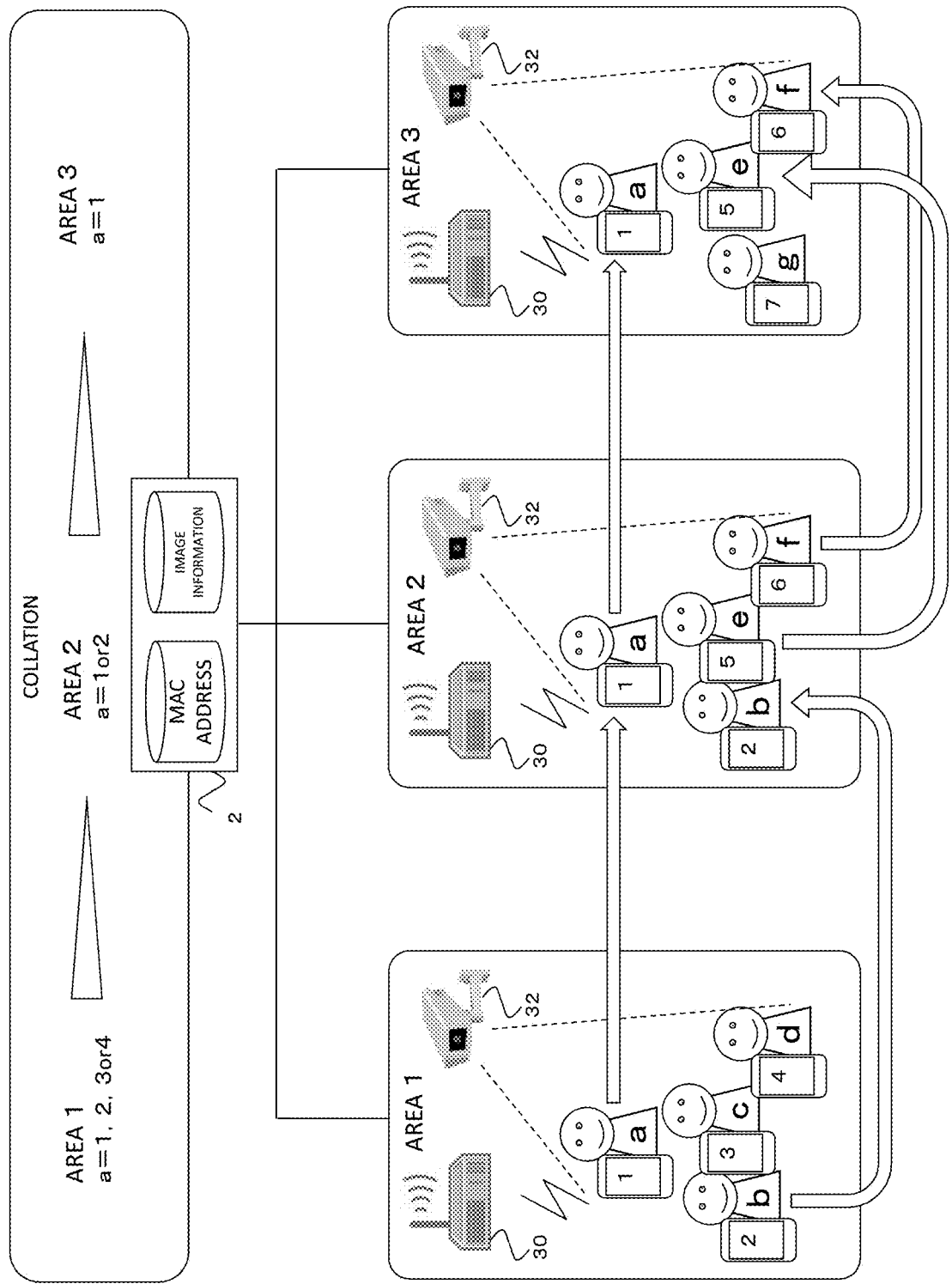
FIG. 10 is a diagram schematically illustrating an example of an embodiment in Third Example.

An example of an embodiment in Third Example is schematically illustrated in FIG. 10. An example of an embodiment in FIG. 10 is similar to the case of First Example.

First, similarly to First Example, when a user is positioned in the communicative range of an area 1 that is the wireless LAN communication spot, communication between a portable communication terminal 5 used by the user and a wireless LAN switch 31 is established (S200), and the MAC address of the portable communication terminal 5 is sent to the wireless LAN switch 31 through the access point 30. Then, the wireless LAN switch 31 transmits information that identifies the wireless LAN communication spot, date and time information, and the MAC address to a management computer 2, and a communication terminal identification information acquisition processing unit 20 of the management computer 2 that has received the information stores the information to a communication terminal identification information storage unit 21 (S210).

Further, the security camera in the area 1 captures a moving image or a still image, and acquires the image information (S220). The security camera then transmits the acquired image information to the management computer 2 together with the information that identifies the wireless LAN communication spot, the date and time information of the captured date and time, and the like.

The person identifying information comparison processing unit 26 compares at least two or more pieces of the image information captured by the security camera in the same wireless LAN communication spot, or at least two or more pieces of the image information captured by the respective security cameras in the different wireless LAN communication spots, and determines whether the same person is captured (S230). That is, the person identifying information comparison processing unit 26 extracts the face image information of a person from each image information, and compares the extracted face image information of a person and the image information of a person extracted from the other image information using a face image recognition technology or the like, and determines whether the same person is captured. Whether the same person is captured is determined such that characteristic points of the faces in the face image information are extracted, and determination of identity of the persons based on the face image information is performed according to the degree of coincidence of the extracted characteristic points.

In FIG. 10, the face image information of users "a" to "d" is extracted from the image information of the area 1, and the face image information of the users "a", "b", "e", and "f" is extracted from the image information of an area 2. Then, coincidence of the face image information of the users "a" and "b" can be determined between the image information of the area 1 and the image information of the area 2.

Then, the communication terminal identification information narrowing-down processing unit 27 extracts MAC addresses corresponding to the image information of the area 1, and the image information of the area 2 from the communication terminal identification information storage unit 21 (assume that this case is similar to FIG. 4), and narrows down overlapping MAC addresses. Then, either a MAC address "12-34-56-78-90-12" or a MAC address "34-56-78-90-12-34" can be narrowed down to one of the MAC addresses of the portable communication terminals 5 of the users "a" and "b" (S240).

Further, when the image information of an area 3 is acquired in the person identifying information comparison processing unit 26 (S220), and is compared with the image information of the area 1 or the area 2 (S230), only the user "a" can be determined to be the same person. Further, when the communication terminal identification information narrowing-down processing unit 27 extracts the MAC address corresponding to the image information of the area 3 from the communication terminal identification information storage unit 21, and performs narrowing-down processing based on duplication, the MAC address "12-34-56-78-90-12" can be determined as the MAC address of the user "a" (S240).

By executing the above processing, the communication terminal identification information of the portable communication terminal 5 used by a specific person can be narrowed down even if the bio-information such as the face image information is not registered in advance.

Note that the narrowed-down communication terminal identification information may be provided to the investigating authority, which is similar to First and Second Examples.

Further, by executing narrowing-down and identification of the communication terminal identification information about unspecified persons, when information that a specific person (user) is a suspect of a criminal act is provided from the investigating authority with certainty afterward, intervention in the communication such as interruption of the communication can be immediately performed because the narrowing-down and identification of correspondence between the user and the communication terminal identification information has already been performed.

Further, the bio-information such as the face image information extracted from the person identifying information acquired in the person identifying information comparison processing unit 26 of the management computer 2 may be successively sent to the collation system 4 used by the investigating authority, and may be compared with the bio-information of the person registered in advance at the investigating authority, in parallel to the processing in the present embodiment. In this case, when matching with the person registered in advance at the investigating authority side is determined, the output processing unit 25 may receive a determination result from the collation system 4 of the investigating authority side or the like, and notify the narrowed-down and identified communication terminal identification information, which is used by the person, to the collation system 4 of the investigating authority side.

Fourth Example

First Example has shown processing of a case in a plurality of wireless LAN communication spots, and Second Example has shown processing of a case in the same wireless LAN communication spot. Further, Third Example has shown a case of performing processing without using bio-information of a person registered in advance, unlike First and Second Examples. In Fourth Example, an embodiment of setting a communicative range of a wireless LAN communication spot to a very narrow range to which only one person can make an access, for example, a range about one meter, will be described. In this case, the communicative range is extremely narrow, and thus a capturing range by a security camera can be set in a pinpoint manner, and only one person can be targeted. As communication of the wireless LAN communication spot, an output of the communication may just be set such that only a person who passes through a gate can perform effective communication. That is, since electric waves expand in a concentric manner, a plurality of users can be connectable even in such a narrow range. However, in principle, the output may just be set such that only the user who passes through the gate (the user who receives the strongest electric waves) becomes able to perform communication. The setting may be made such that connection of communication can be established only with one terminal, other than the setting with the communicative range.

Figure 11:
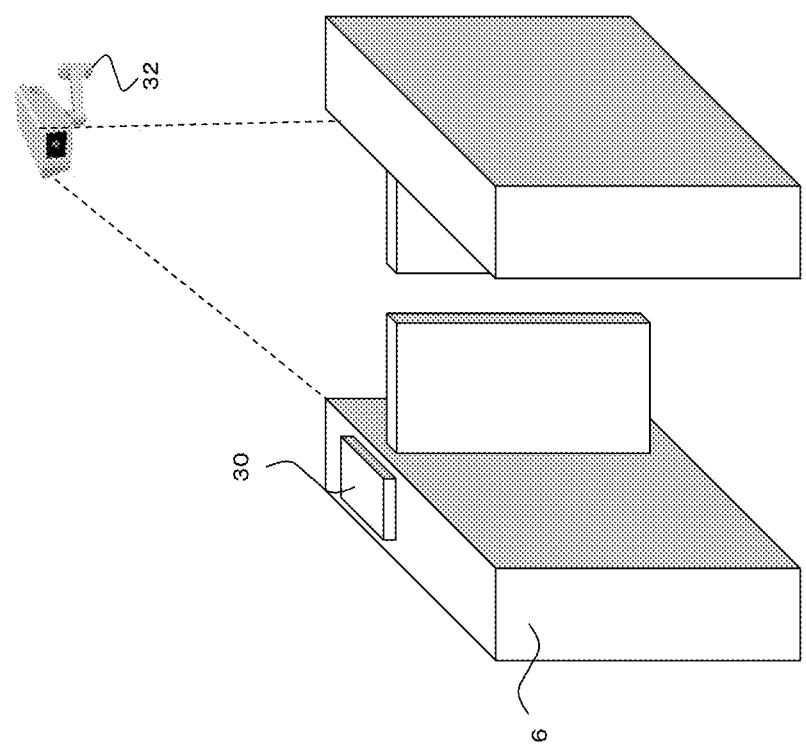
FIG. 11 is a diagram schematically illustrating an example of a case of installing an access point and a security camera in a security gate in Fourth Example.

The present embodiment can be used in a security gate 6 of an airport or the like. An example of the present embodiment is schematically illustrated in FIG. 11. In this case, an access point 30 or a wireless LAN switch 31 is installed at or near the security gate 6, and a vicinity of a passage area of the security gate 6 is captured by a security camera. With such a configuration, when the user passes through the security gate 6, wireless communication is established between the wireless LAN switch 31 and a portable communication terminal 5, and the user can be captured by the security camera.

Processing in the present embodiment is substantially similar to that in Second Example. Communication terminal identification information of the portable communication terminal 5 acquired by the wireless LAN switch 31, and image information captured by the security camera are sent to a management computer 2. The communication terminal identification information is stored in a communication terminal identification information storage unit 21, and the image information is sent to a collation processing system by a person collation processing unit 22 and processing for collating the image information with a person registered in advance is executed.

In the present embodiment, the communicative range of the access point 30 is extremely narrow, and thus basically one person is captured when capturing is performed by the security camera. Therefore, when a collation system 4 executes processing for collating the user with a person registered in advance based on the image information acquired by the person collation processing unit 22, and if the user is determined to be the person registered in advance, the determined person and the communication terminal identification information, which is managed by the access point 30 or the wireless LAN switch 31 and stored in the communication terminal identification information storage unit 21, correspond to each other on a one-to-one basis. Therefore, the communication terminal identification information can be identified without using a plurality of pieces of image information.

That is, when the person collation processing unit 22 acquires a collation result in the collation processing system, a candidate information identifying processing unit 23 extracts the communication terminal identification information storage unit 21 corresponding to the image information. At this time, the image information and the communication terminal identification information correspond on a one-on-one basis, and thus only one piece of communication terminal identification information can be extracted and identified. Therefore, processing in a communication terminal identification information identifying processing unit 24 may not be executed.

Note that, in the present embodiment, a sensor may be installed at or near the security gate 6, and passage through the security gate 6 and processing for capturing the image information by the security gate 6 may be linked. Alternatively, processing for acquiring the communication terminal identification information of the portable communication terminal 5 used by a person who is about to pass through the security gate 6, by the access point 30 or the wireless LAN switch 31, and processing for capturing the image information by the security camera may be linked.

Further, the narrowed-down communication terminal identification information may be provided to an investigating authority.

Fifth Example

As a different embodiment of the present invention, a function to make an inquiry about communication terminal identification information to a communication provider of a portable communication terminal 5, as a result of narrowing-down by a management computer 2. Accordingly, detailed information of customers can be acquired.

INDUSTRIAL APPLICABILITY

When the person registered in advance is performing communication through the wireless LAN in the wireless LAN communication spot, the communication terminal identification information of the person can be identified by the information processing system 1 of the present invention. Accordingly, for example, when the user who is registered as a person at a high risk for criminal wrongdoing is performing communication through the wireless LAN, the communication can be output. Therefore, intervention in the communication through the wireless LAN communication spot, such as interruption or interception of the communication, distribution of false information, and stop of activation of a detonator of explosives through the network becomes possible, and the invention can be used for prevention of the criminal wrongdoing.

Further, although the communication terminal identification information can be falsified, usually, the falsification requires a certain operation, and when the person goes out, the person usually uses the same "falsified" communication terminal identification information at least for the day. Therefore, even if the communication terminal identification information is falsified, intervention in the communication can be made by use of the present invention.

REFERENCE SIGNS LIST

1 Information processing system
2 Management computer
4 Collation system
5 Portable communication terminal
6 Gate
20 Communication terminal identification information acquisition processing unit
21 Communication terminal identification information storage unit
22 Person collation processing unit
23 Candidate information identifying processing unit
24 Communication terminal identification information identifying processing unit
25 Output processing unit
26 Person identifying information comparison processing unit
27 Communication terminal identification information narrowing-down processing unit
30 Access point
31 Wireless LAN switch
32 Person identifying information acquisition device
70 Calculation device
71 Storage device
72 Display device
73 Input device
74 Communication device

The invention claimed is:

1. An information processing system that identifies communication terminal identification information of a user who performs communication with a portable communication terminal using a wireless communication device,
the information processing system comprising:
a communication terminal identification information storage unit configured to store the communication terminal identification information of the portable communication terminal that performs communication using the wireless communication device, wherein the communication terminal identification information comprises a MAC address;

a person collation processing unit configured to perform collation as to whether there is a person registered in advance using person identifying information acquired in a person identifying information acquisition device in a wireless LAN communication spot where the wireless communication device exists;

a candidate information identifying processing unit configured to identify, from the communication terminal identification information storage unit, the communication terminal identification information as candidate information, by extracting the communication terminal identification information corresponding to the person identifying information from the communication terminal identification information storage unit, when existence of the person registered in advance is determined as a result of the collation; and a communication terminal identification information identifying processing unit configured to perform processing for narrowing down the communication terminal identification information of the portable communication terminal of the user who performs communication using the wireless communication terminal, by identifying common communication terminal identification information from at least two or more pieces of the candidate information for a same person, wherein the narrowed down portable communication terminal of the user who performs communication using the wireless communication terminal is identified, wherein communication between the wireless communication device and the identified portable communication terminal of the user is intercepted, and wherein false information is distributed to the identified portable communication terminal of the user through the intercepted communication between the wireless communication device and the identified portable communication terminal of the user.

2. An information processing system having a wireless communication device and a person identifying information acquisition device installed at or near a gate, and which identifies communication terminal identification information of a portable communication terminal used by a person who passes through the gate, the wireless communication device being set to perform communication with the portable communication terminal used by the person who passes through the gate, the information processing system comprising:

a communication terminal identification information storage unit configured to store the communication terminal identification information of the portable communication terminal that performs communication using the wireless communication device, wherein the communication terminal identification information comprises a MAC address;

a person collation processing unit configured to perform collation as to whether there is a person registered in advance using person identifying information acquired in the person identifying information acquisition device;

a candidate information identifying processing unit configured to perform processing for identifying, from the communication terminal identification information storage unit, the communication terminal identification information of the portable communication terminal of a user who performs communication using the wireless communication device, by extracting the communication terminal identification information corresponding to the person identifying information from the communication terminal identification information storage unit, when existence of the person registered in advance is determined as a result of the collation; and a communication terminal identification information identifying processing unit configured to perform processing for narrowing down the communication terminal identification information of the portable communication terminal of the user who performs communication using the wireless communication device, by identifying common communication terminal identification information from at least two or more pieces of the candidate information for a same person, wherein the narrowed down portable communication terminal of the user who performs communication using the wireless communication terminal is identified, wherein communication between the wireless communication device and the identified portable communication terminal of the user is intercepted, and wherein false information is distributed to the identified portable communication terminal of the user through the intercepted communication between the wireless communication device and the identified portable communication terminal of the user.

3. The information processing system according to claim 2, wherein a sensor is installed at or near the gate, and passage of the gate and the acquisition processing of the person identifying information acquisition device are linked, or the processing for acquiring the communication terminal identification information of the portable communication terminal used by the user who passes through the gate in the wireless communication device and the acquisition processing of the person identifying information acquisition device are linked.

4. The information processing system according to claim 1, wherein collation processing using the person identifying information acquired in the person identifying information acquisition device is executed by collating the person identifying information and bio-information of the person registered in advance.

5. An information processing system that identifies communication terminal identification information of a user who performs communication with a portable communication terminal using a wireless communication device, the information processing system comprising:

a communication terminal identification information storage unit configured to store the communication terminal identification information of the portable communication terminal that performs communication using the wireless communication device, wherein the communication terminal identification information comprises a MAC address;

a person identifying information comparison processing unit configured to determine whether there is a same person using at least two or more pieces of person identifying information acquired in a person identifying information acquisition device in a wireless LAN communication spot where the wireless communication device exists; and a communication terminal identification information narrowing-down processing unit configured to perform, from the communication terminal identification information storage unit, processing for narrowing down the communication terminal identification information of the portable communication terminal of the user who performs communication using the wireless communication device, by extracting pieces of communication terminal identification information corresponding to the respective pieces of person identifying information from the communication terminal identification information storage unit, and identifying common communication terminal identification information, when existence of the same person is determined as a result of the determination, wherein the narrowed down portable communication terminal of the user who performs communication using the wireless communication terminal is identified, wherein communication between the wireless communication device and the identified portable communication terminal of the user is intercepted, and wherein false information is distributed to the identified portable communication terminal of the user through the intercepted communication between the wireless communication device and the identified portable communication terminal of the user.

6. An information processing method for identifying communication terminal identification information of a user who performs communication with a portable communication terminal using a wireless communication device, the information processing method comprising, in a computer, the steps of:

acquiring the communication terminal identification information of the portable communication terminal that performs communication using the wireless communication device, wherein the communication terminal identification information comprises a MAC address;

performing collation as to whether there is a person registered in advance using person identifying information acquired in a person identifying information acquisition device in a wireless LAN communication spot where the wireless communication device exists;

identifying the communication terminal identification information as candidate information, by extracting the communication terminal identification information corresponding to the person identifying information, of the acquired communication terminal identification information, when existence of the person registered in advance is determined as a result of the collation; and performing processing for narrowing down the communication terminal identification information of the portable communication terminal of the user who performs communication using the wireless communication device, by identifying common communication terminal identification information, from at least two or more pieces of the candidate information for a same person, wherein the narrowed down portable communication terminal of the user who performs communication using the wireless communication terminal is identified, wherein communication between the wireless communication device and the identified portable communication terminal of the user is intercepted, and wherein false information is distributed to the identified portable communication terminal of the user through the intercepted communication between the wireless communication device and the identified portable communication terminal of the user.

7. An information processing method for identifying communication terminal identification information of a portable communication terminal used by a person who passes through a gate, where a wireless communication device and a person identifying information acquisition device are installed at or near the gate, the wireless communication device being set to perform communication with the portable communication terminal used by the person who passes through the gate, the information processing method comprising, in a computer, the steps of:

acquiring the communication terminal identification information of the portable communication terminal that performs communication using the wireless communication device, wherein the communication terminal identification information comprises a MAC address;

performing collation as to whether there is a person registered in advance using person identifying information acquired in the person identifying information acquisition device;

performing processing for identifying the communication terminal identification information of the portable communication terminal of the user who performs communication using the wireless communication device, by extracting the communication terminal identification information corresponding to the person identifying information, of the acquired communication terminal identification information, when existence of the person registered in advance is determined as a result of the collation; and performing processing for narrowing down the communication terminal identification information of the portable communication terminal of the user who performs communication using the wireless communication device, by identifying common communication terminal identification information, from at least two or more pieces of a candidate information for a same person, wherein the narrowed down portable communication terminal of the user who performs communication using the wireless communication terminal is identified, wherein communication between the wireless communication device and the identified portable communication terminal of the user is intercepted, and wherein false information is distributed to the identified portable communication terminal of the user through the intercepted communication between the wireless communication device and the identified portable communication terminal of the user.

8. An information processing method for identifying communication terminal identification information of a portable communication terminal using a wireless communication device, of when there are two or more wireless LAN communication spots, each of the wireless LAN communication spots including the wireless communication device and a camera that captures a part or a whole of a communicative range of the wireless communication device, the information processing method comprising, in a computer, the steps of:

acquiring image information captured by the camera in a first wireless LAN communication spot;

acquiring image information captured by the camera in a second wireless LAN communication spot;

collating the acquired pieces of image information and bio-information of a person registered in advance, and performing collation as to whether the registered person is captured in the image information; and when the registered person is determined to be captured, comparing the communication terminal identification information of the portable communication terminal that performs communication using the first wireless LAN communication spot, and the communication terminal identification information of the portable communication terminal that performs communication using the second wireless LAN communication spot, corresponding to the determined image information, and identifying common communication terminal identification information, wherein the communication terminal identification information comprises a MAC address, and wherein the narrowed down portable communication terminal of the user who performs communication using the wireless communication terminal is identified, wherein communication between the wireless communication device and the identified portable communication terminal of the user is intercepted, and wherein false information is distributed to the identified portable communication terminal of the user through the intercepted communication between the wireless communication device and the identified portable communication terminal of the user.

9. An information processing method for identifying communication terminal identification information of a portable communication terminal using a wireless communication device, of a wireless LAN communication spot including the wireless communication device and a camera that captures a part or a whole of a communicative range of the wireless communication device, the information processing method comprising, in a computer, the steps of:

acquiring image information captured by the camera at a first point of time;

acquiring image information captured by the camera at a second point of time;

collating the acquired pieces of image information and bio-information of a person registered in advance, and performing collation as to whether the registered person is captured in the image information; and when the registered person is determined to be captured, comparing the communication terminal identification information of the portable communication terminal that performs communication using the wireless LAN communication spot at the first point of time, and the communication terminal identification information of the portable communication terminal that performs communication using the wireless LAN communication spot at the second point of time, corresponding to the determined image information, and identifying common communication terminal identification information, wherein the communication terminal identification information comprises a MAC address, and wherein the narrowed down portable communication terminal of the user who performs communication using the wireless communication terminal is identified, wherein communication between the wireless communication device and the identified portable communication terminal of the user is intercepted, and wherein false information is distributed to the identified portable communication terminal of the user through the intercepted communication between the wireless communication device and the identified portable communication terminal of the user.

10. An information processing method for identifying communication terminal identification information of a portable communication terminal using a wireless communication device, of when there are two or more wireless LAN communication spots, each of the wireless LAN communication spots including the wireless communication device and a camera that captures a part or a whole of a communicative range of the wireless communication device, the information processing method comprising, in a computer, the steps of:

acquiring image information captured by the camera in a first wireless LAN communication spot;

acquiring image information captured by the camera in a second wireless LAN communication spot;

extracting face image information of a captured person from the acquired pieces of image information, and determining whether a same person is captured in each of the image information, by comparing the extracted face image information of a person and the face image information of a person extracted from the other image information; and when the same person is determined to be captured in each of the image information, comparing the communication terminal identification information of the portable communication terminal that performs communication using the first wireless LAN communication spot, and the communication terminal identification information of the portable communication terminal that performs communication using the second wireless LAN communication spot, corresponding to the pieces of image information, and identifying common communication terminal identification information, wherein the communication terminal identification information comprises a MAC address, and wherein the narrowed down portable communication terminal of the user who performs communication using the wireless communication terminal is identified, wherein communication between the wireless communication device and the identified portable communication terminal of the user is intercepted, and wherein false information is distributed to the identified portable communication terminal of the user through the intercepted communication between the wireless communication device and the identified portable communication terminal of the user.

11. An information processing method for identifying communication terminal identification information of a portable communication terminal using a wireless communication device, of a wireless LAN communication spot including the wireless communication device and a camera that captures a part or a whole of a communicative range of the wireless communication device, the information processing method comprising, in a computer, the steps of:

acquiring image information captured by the camera at a first point of time;

acquiring image information captured by the camera at a second point of time;

extracting face image information of a captured person from the acquired pieces of image information, and determining whether a same person is captured in each of the image information, by comparing the extracted face image information of a person and the face image information of a person extracted from the other image information; and when the same person is determined to be captured in each of the image information, comparing the communication terminal identification information of the portable communication terminal that performs communication using the wireless LAN communication spot at the first point of time, and the communication terminal identification information of the portable communication terminal that performs communication using the wireless LAN communication spot at the second point of time, corresponding to the respective pieces of image information, and identifying common communication terminal identification information, wherein the communication terminal identification information comprises a MAC address, and wherein the narrowed down portable communication terminal of the user who performs communication using the wireless communication terminal is identified, wherein communication between the wireless communication device and the identified portable communication terminal of the user is intercepted, and wherein false information is distributed to the identified portable communication terminal of the user through the intercepted communication between the wireless communication device and the identified portable communication terminal of the user.

12. The information processing system according to claim 2, wherein collation processing using the person identifying information acquired in the person identifying information acquisition device is executed by collating the person identifying information and bio-information of the person registered in advance.

13. The information processing system according to claim 1, wherein the person identifying information acquisition device is installed at or near a gate.

14. The information processing system according to claim 13, wherein a sensor is installed at or near the gate.

15. The information processing system according to claim 14, wherein passage of the gate and the acquisition processing of the person identifying information acquisition device are linked.

16. The information processing system according to claim 14, wherein the processing for acquiring the communication terminal identification information of the portable communication terminal used by the user who passes through the gate in the wireless communication device and the acquisition processing of the person identifying information acquisition device are linked.

17. The information processing system according to claim 1, wherein the distributed false information to the identified portable communication terminal of the user stops activation of a detonator sent via the identified portable communication terminal of the user.

* * * * *